United States Patent
Dinkjian et al.

(10) Patent No.: US 9,424,173 B2
(45) Date of Patent: Aug. 23, 2016

(54) PERFORMING SECURE ADDRESS RELOCATION WITHIN A MULTI-PROCESSOR SYSTEM SHARING A SAME PHYSICAL MEMORY CHANNEL TO EXTERNAL MEMORY

(71) Applicant: GLOBALFOUNDRIES Inc., Grand Cayman (KY)

(72) Inventors: Robert M. Dinkjian, Austin, TX (US); Brian Flachs, Georgetown, TX (US); Michael Y. Lee, Atkinson, NH (US); Bill N. On, Austin, TX (US)

(73) Assignee: GLOBALFOUNDRIES, Inc., Grand Cayman (KY)

( * ) Notice: Subject to any disclaimer, the term of this patent is extended or adjusted under 35 U.S.C. 154(b) by 7 days.

(21) Appl. No.: 14/521,739

(22) Filed: Oct. 23, 2014

(65) Prior Publication Data

US 2016/0117240 A1    Apr. 28, 2016

(51) Int. Cl.
*G06F 12/02* (2006.01)

(52) U.S. Cl.
CPC .............. *G06F 12/02* (2013.01); *G06F 12/023* (2013.01); *G06F 12/0223* (2013.01); *G06F 2212/1044* (2013.01)

(58) Field of Classification Search
CPC ... G06F 12/02; G06F 12/0223; G06F 12/023; G06F 2212/1052
USPC ................... 711/165, 170, 202, 203
See application file for complete search history.

(56) References Cited

U.S. PATENT DOCUMENTS

| | | | |
|---|---|---|---|
| 6,314,501 B1 | 11/2001 | Gulick et al. | |
| 6,480,941 B1 | 11/2002 | Franke et al. | |
| 8,006,021 B1 | 8/2011 | Li et al. | |
| 8,561,078 B2 | 10/2013 | Sandstrom | |
| 8,667,212 B2* | 3/2014 | McWilliams | G06F 12/0284 711/103 |
| 9,086,957 B2* | 7/2015 | Cordero | G06F 11/2221 |
| 9,195,593 B1* | 11/2015 | Radovic | G06F 12/0253 |
| 2007/0239966 A1 | 10/2007 | Georgiou et al. | |
| 2012/0210071 A1 | 8/2012 | Black et al. | |
| 2014/0040576 A1* | 2/2014 | Cordero | G06F 11/2221 711/162 |

OTHER PUBLICATIONS

Zeldovich et al, "Hardware Enforcement of Application Security Policies Using Tagged Memory", accessed via the Internet from <http://www.scs.stanford.edu/~nickolai/papers/zeldovich-loki.pdf> as of Apr. 12, 2014, 16 pages.

(Continued)

*Primary Examiner* — Pierre-Michel Bataille
(74) *Attorney, Agent, or Firm* — Robert Curcio; DeLio Peterson & Curcio, LLC

(57) ABSTRACT

In response to receiving a selection to override an existing memory allocation of one or more regions of an external memory device within a memory register for a particular bridge from among multiple bridges within an integrated circuit, wherein the multiple bridges connect to a shared physical memory channel to the external memory device, a remap controller of the particular bridge reads, from a super rank register, one or more super rank values specifying one or more relocation regions of the external memory device connected to an interface of the integrated circuit. The remap controller remaps the memory register for the particular bridge with the one or more super rank values specified in the super rank register to relocate memory accesses by the bridge to the one or more relocation regions of the external memory device.

21 Claims, 7 Drawing Sheets

(56) References Cited

OTHER PUBLICATIONS

"IBM CoreConnect and CPU Support Cores", copyright IBM 2006, accessed via the Internet from <https://www-01.ibm.com/chips/techlib/techlib.nsf/techdocs/17CB61E52C8CAAF087257139004B0B80/$file/G224-7592-01_coreconnect.pdf>, 4 pages.

Ron Wilson, "Memory Bandwidth Takes Center Stage at Hot Chips Conference", accessed via the Internet from <http://www.altera.com/technology/system-design/articles/2013/memory-bandwidth-hot-chips-conference.html> as of Apr. 12, 2014, 4 pages.

Jin et al, "Improving the Performance of Shared Memory Communication in Impulse C", Embedded Systems Letters, IEEE, vol. 2, Issue 3, pp. 49-52, 4 pages.

Njoroge et al, "ATLAS: A Chip-Multiprocessor with Transactional Memory Support", accessed via the Internet from <http://csl.stanford.edu/~christos/publications/2007.atlas.date.pdf> as of Apr. 12, 2014, 6 pages.

VMWare, "The Role of Memory in VMWare ESX Server 3", copyright 2006 VMWare, accessed via the Internet from <http://www.vmware.com/pdf/esx3_memory.pdf> as of Apr. 12, 2014, 11 pages.

"The CoreConnect(TM) Bus Architecture", copyright 1999 International Business Machines Corporation, 8 pages.

Young et al, "Dynamic Partitioned Global Address Spaces for Power Efficient DRAM Virtualization", Green Computing Conference, 2010 International, pp. 485-492, 8 pages.

Yun et al., "MemGuard: Memory Bandwidth Reservation System for Efficient Performance Isolation in Multi-Core Platforms", Real-Time and Embedded Technology and Applications Symposium, Apr. 2013, pp. 55-64, 10 pages.

Muralidhara et al, "Reducing Memory Interference in Multicore Systems via Application-Aware Memory Channel Partitioning", Micro-44 Proceedings of the 44th Annual IEEE/ACM International Symposium on Microarchitecture, 2011, 12 pages.

Moscibroda et al, "Memory Performance Attacks: Denial of Memory Service in Multi-Core Systems", 16th USENIX Security Symposium, 2007, 18 pages.

Liang et al, "An Architecture and Compiler for Scalable On-Chip Communication", IEEE Transactions on Very Large Scale Integration (VLSI) Systems, 2004, 16 pages.

"Processor Local Bus Architecture Specification", copyright 2006, 2012, IBM, accessed via the Internet from <https://www-01.ibm.com/chips/techlib/techlib.nsf/techdocs/B507AB32B6ACC15B852577F50064848E/$file/PLB6Spec_2012NOV15_v101_NotConNotP6Plus_ext_pub.pdf> as of Apr. 12, 2014, 76 pages.

* cited by examiner

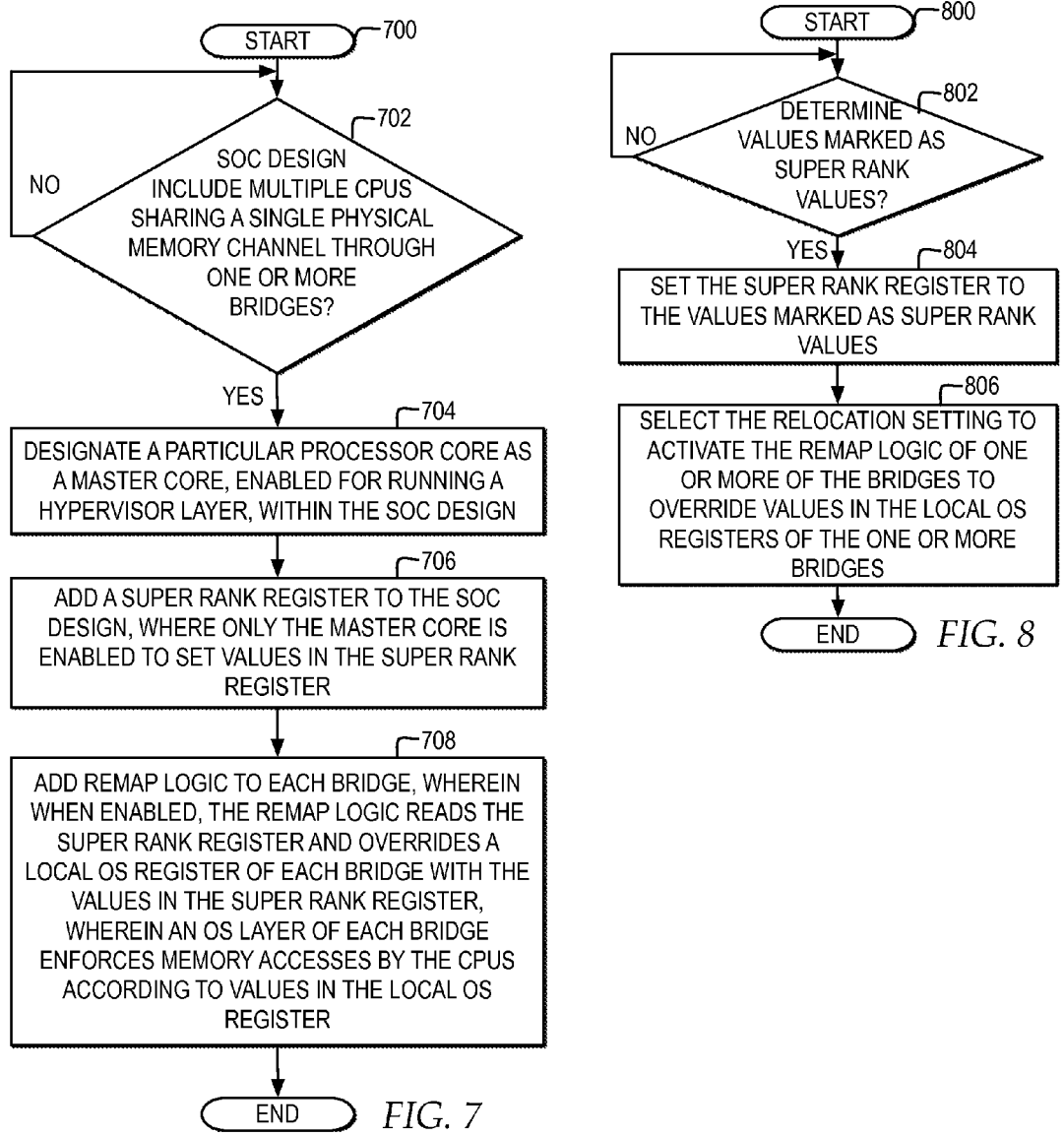

PERFORMING SECURE ADDRESS RELOCATION WITHIN A MULTI-PROCESSOR SYSTEM SHARING A SAME PHYSICAL MEMORY CHANNEL TO EXTERNAL MEMORY

1. TECHNICAL FIELD

The embodiment of the invention relates generally to a multi-processor integrated circuit and particularly to performing secure address relocation within a multi-processor integrated circuit sharing a same physical memory channel to external memory.

2. DESCRIPTION OF THE RELATED ART

A system on chip (SOC) is an integrated circuit that integrates the components of a computer system or electronic system into a single integrated circuit, or chip. A SOC often integrates multiple functional cores, such as multiple processor cores. In an SOC, to minimize the costs, a single memory controller may be implemented and the multiple functional cores share the single memory controller as a shared physical memory channel to external memory.

BRIEF SUMMARY

In view of the foregoing, there is a need for a method, system, and computer program product for a hardware enforced use of external memory by processor cores that use a shared same physical memory channel to external memory within an SOC, by a hardware element of the SOC specified for overriding the values in any registers within the SOC specifying the memory regions allocated to one or more processor cores, where the hardware element may operate without the processor cores being aware of any address relocations performed by the hardware element to enforce memory usage by the processor cores.

In one embodiment, a method for performing secure address relocation is directed to, in response to receiving a selection to override an existing memory allocation of one or more regions of an external memory device within a memory register for a particular bridge from among a plurality of bridges within an integrated circuit, wherein the plurality of bridges connect to a shared physical memory channel to the external memory device, reading, by a remap controller of the particular bridge, from a super rank register, one or more super rank values specifying one or more relocation regions of the external memory device connected to one or more interfaces of the integrated circuit. The method is directed to remapping the memory register for the particular bridge with the one or more super rank values specified in the super rank register to relocate memory accesses by the bridge to the one or more relocation regions of the external memory device, wherein one or more processor units are connected to each of the plurality of bridges within a single integrated circuit device, wherein only a particular processor unit of the integrated device is allowed to set the super rank register values.

In another embodiment, a system for performing secure address relocation includes an integrated circuit comprising multiple bridges connected through a shared physical memory channel to one or more external memory devices connected to one or more interfaces of the integrated circuit. The system includes the integrated circuit operative, in response to receiving a selection to override an existing memory allocation of one or more regions of the one or more external memory devices within a memory register for a particular bridge from among the multiple bridges, to trigger a remap controller of the particular bridge, to read from a super rank register, one or more super rank values specifying one or more relocation regions of the one or more external memory devices. The system includes the remap controller operative to remap the memory register for the particular bridge with the one or more super rank values specified in the super rank register to relocate memory accesses by the bridge to the one or more relocation regions of the one or more external memory devices, wherein one or more processor units are connected to each of the multiple bridges within a single integrated circuit device, wherein only a particular processor unit of the integrated device is allowed to set the super rank register values.

In another embodiment, a computer program product for performing secure address relocation, the computer program product comprises a computer readable storage medium having program instructions embodied therewith. The program instructions are executable by a integrated circuit to cause the integrated circuit to, in response to receiving a selection to override an existing memory allocation of one or more regions of one or more external memory devices within a memory register for a particular bridge from among a plurality of bridges within the integrated circuit, wherein the plurality of bridges connect through a shared physical memory channel to the one or more external memory devices, read, by a remap controller of the particular bridge, from a super rank register, one or more super rank values specifying one or more relocation regions of the one or more external memory devices connected to one or more interfaces of the integrated circuit. The program instructions are executable by a integrated circuit to cause the integrated circuit to remap, by the remap controller, the memory register for the particular bridge with the one or more super rank values specified in the super rank register to relocate memory accesses by the bridge to the one or more relocation regions of the one or more external memory devices, wherein one or more processor units are connected to each of the plurality of bridges within a single integrated circuit device, wherein only a particular processor unit of the integrated device is allowed to set the super rank register values.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 7 illustrates one example of a high level logic flowchart of a process and program for managing a design of a SOC to enable the SOC to perform secure address relocation within a multi-processor system sharing a same physical memory channel to external memory;

FIG. 8 illustrates one example of a high level logic flowchart of a process and program for triggering hardware enforced memory access management within a multi-processor system sharing a same physical memory channel to external memory;

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
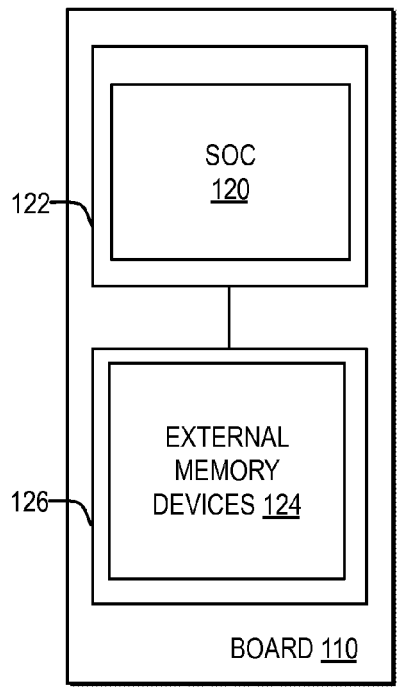
FIG. 1 illustrates one example of a block diagram of a system on a chip (SOC) connected to external memory devices via a shared physical memory channel.

FIG. 1 illustrates a block diagram of a system on a chip (SOC) connected to external memory devices via a shared physical memory channel.

In one example, a system on chip (SOC) 120 represents an integrated circuit that includes one or more functional cores and additional components, integrated on a single chip and functional together as a computer system. In one example, functional cores may include, but are not limited to, processor cores, memory cores, and other types of functional cores. In one example, additional components may include, but are not limited to, additional processor cores, memory cores, interface units, analog control units and interfaces, voltage regulators, power management circuits, one or more buses running between one or more of the elements on SOC 120, and bus control units.

In one example, while SOC 120 may represent a single chip that functions as a computer system, additional elements may be connected to SOC 120 to expand the functionality of SOC 120. In one example, one or more external memory devices may be attached to SOC 120, such as external memory devices 124, to expand the memory accessible to SOC 120. External memory devices 124 may include one or more types of memory devices. For example, external memory devices 124 may include multiple ranks of physical memory, where each rank of memory represents a separate physical memory device, such as a dual in-line memory module (DIMM) comprising a series of dynamic random-access memory (RAM) integrated circuits. The use of multiple ranks within memory devices 124 may allow for overlapping memory access requests to external memory devices 124 to improve the system performance of SOC 120. In one example, external memory devices 124 may be affixed to board 110 in one or more types of configurations including, but not limited to, one or more of the memory devices of external memory devices 124 directly affixed to a board 110 and one or more of the memory devices of external memory devices 124 affixed to one or more boards that are affixed to board 110.

In one example, external memory devices 124 may connect to SOC 120 through a connection integrated within board 110 or may connect to SOC 120 through a connection not integrated within board 110. In one example, board 110 may represent a printed circuit board (PCB) or other similar substrate for supporting circuit elements, and may include mechanical supports and electrical connections for connecting one or more elements. In one example, board 110 may implement electrical connections through conductive tracks, pads, and other elements laid out and etched into metal sheets laminated onto a non-conductive substrate. In one example, board 110 may include a connector pad 122 for attaching SOC 120 to board 110 and with a connector pad 126 for connecting external memory devices 124 to board 110, where connector pad 122 is connected to connector pad 126 on board 110 through an electrical connection to enable connection of one or more external interfaces of SOC 120 to one or more components attached to connector pad 126. In one example, SOC 120 and external memory devices 124 may each be interchangeably attached to board 110. In another example, one or more of SOC 120 and external memory devices 124 may be permanently affixed to board 110. One of ordinarily skill in the art will appreciate that in additional or alternate embodiments the integrated circuits of SOC 120 and external memory devices 124 may be configured, affixed, and connected using additional or alternate types of substrates.

In one example, SOC 120 may include a single memory controller that is shared by the multiple functional cores as a shared physical memory channel to an external interface of SOC 120. In one example, external memory devices 124 may attach to an external interface of SOC 120 for the shared physical memory channel through the electrical connection between connector pad 122 and connector pad 126 on board 110. In another example, one or more external interfaces of SOC 120 and external memory devices 124 may directly connect to one another as attached to board 110 or separate from board 110. In additional or alternate examples, board 110 may include additional or alternate pads, electrical connections, and other elements for enabling attachment of additional components, such as additional external memory devices and additional SOCs and for enabling additional functionality on board 110.

In one example, each of the processor cores within SOC 120 may be allocated one or more regions of external memory devices, which are accessible through the shared physical memory channel. To restrict each processor core to only access memory regions allocated to that processor core, SOC 120 may implement one or more mechanisms to restrict each processor core within SOC 120 from accessing memory regions within external memory devices 124 that are outside allocated ranges to each processor core. In one example, SOC 120 may implement one or more hardware enforced mechanisms to restrict each processor core within SOC 120 from accessing memory regions within external memory devices 124 that are outside allocated ranges to each processor core by relocating memory addressing from regions outside of allocated ranges to regions within allocated ranges, where the hardware enforced mechanisms operate transparently, without the individual processor cores being aware of any address relocations performed to restrict access to memory. In addition, SOC 120 may include bridges for providing interfaces to processor cores, where each bridge implements one or more software enforced mechanisms for enforcing the relocations specified by the hardware enforced mechanisms. In addition, each processor core may implement one or more software enforced mechanisms for providing a first layer of memory access enforcement for each processor core.

Figure 2:
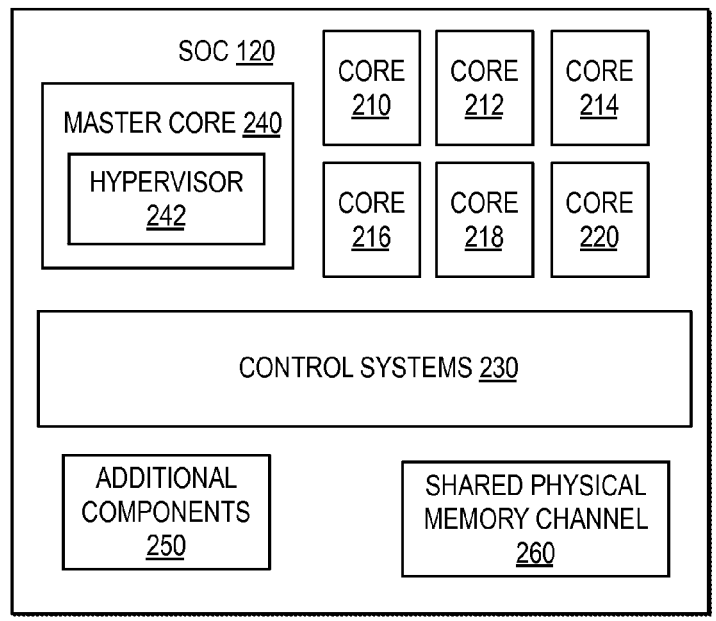
FIG. 2 illustrates one example of a block diagram of a multiple core system on chip that implements a shared physical memory channel.

FIG. 2 illustrates a block diagram of one example of a multiple core system on chip that implements a shared physical memory channel.

In one example, SOC 120 may include multiple functional cores illustrated as core 210, core 212, core 214, core 216, core 218, and core 220. In one example, one or more of core 210, core 212, core 214, core 216, core 218, and core 220 may represent homogenous cores, all of a same type and having the same power requirements, frequency settings, and other functional characteristics. In another example, one or more of core 210, core 212, core 214, core 216, core 218 and core 220 may represent heterogeneous cores, each of one or more different types, having one or more different power requirements, one or more different frequency settings, or one or more different functional characteristics.

In one example, SOC 120 may include one or more additional cores specified as a master core, such as master core 240. In one example, one or more of core 210, core 212, core 214, core 216, core 218, and core 220 may also function as the master core. In one example, the master core may be distinguished from the other cores in that the other cores may execute applications and the master core may not execute application. In another example, the master core may be distinguished as being authorized, by a hardware setting within SOC 120, to operate as the master core. In another example, the master core may be distinguished from the other cores in that the master core only runs a hypervisor 242 and the other cores may run applications in addition to or other than hypervisor 242. In one example, hypervisor 242, which may also be referred to as a virtual machine monitor, refers to a software, hardware, or firmware component that creates and runs virtual machines. In one example, hypervisor 242 runs virtual machines by running a virtual operating system for each virtual machine. Hypervisor 242 may also virtualize hardware resources. One or more virtual machines may share physical or virtualized hardware resources.

In one example, SOC 120 may include one or more additional components 250. Additional components 250 may include, but are not limited to, additional processor cores, memory cores, interface units, analog control units and interfaces, voltage regulators, power management circuits, one or more buses running between one or more of the elements on SOC 102, and bus control units.

In one example, SOC 120 may include control systems 230 that may include one or more buses and controllers for connecting and managing the components of SOC 120, including managing accesses by cores within SOC 120 to external memory devices 124. In one example, one or more of core 210, core 212, core 214, core 216, core 218, and core 220 may be functionally organized as a cluster that is connected through a processor local bus (PLB) within control systems 230. In addition, in one example, control system 230 may include one or more controllers positioned on the buses including, but not limited to, bridges, arbiters, memory control units, and bus control units.

In one example, control system may include shared physical memory channel 260. In one example, shared physical memory channel 260 represents a single memory controller and may include the buses connecting the single memory controller to an external memory device. In one example, shared physical memory channel 260 may include a single set of configuration registers specifying the start address and size of each of the ranks within external memory device 124. In one example, shared physical memory channel 260 manages the memory access requests to external devices 124 for all of core 210, core 212, core 214, core 216, core 218, and core 220.

In one example, to enforce memory accesses by each core within SOC 120, where the multiple cores use shared physical memory channel 260 for accesses to external memory devices 124, SOC 120 may implement operating system based memory access enforcement by operating systems executing within one or more elements of control systems 230. In addition, SOC 120 may also implement hardware-based memory access enforcement through hypervisor 242, executing on master core 240. Hypervisor 242 may setting super rank values specifying memory region allocations for one or more bridges or cores, where the super rank values override the existing region values to be mapped to by the operating system based memory access enforcement.

Figure 3:
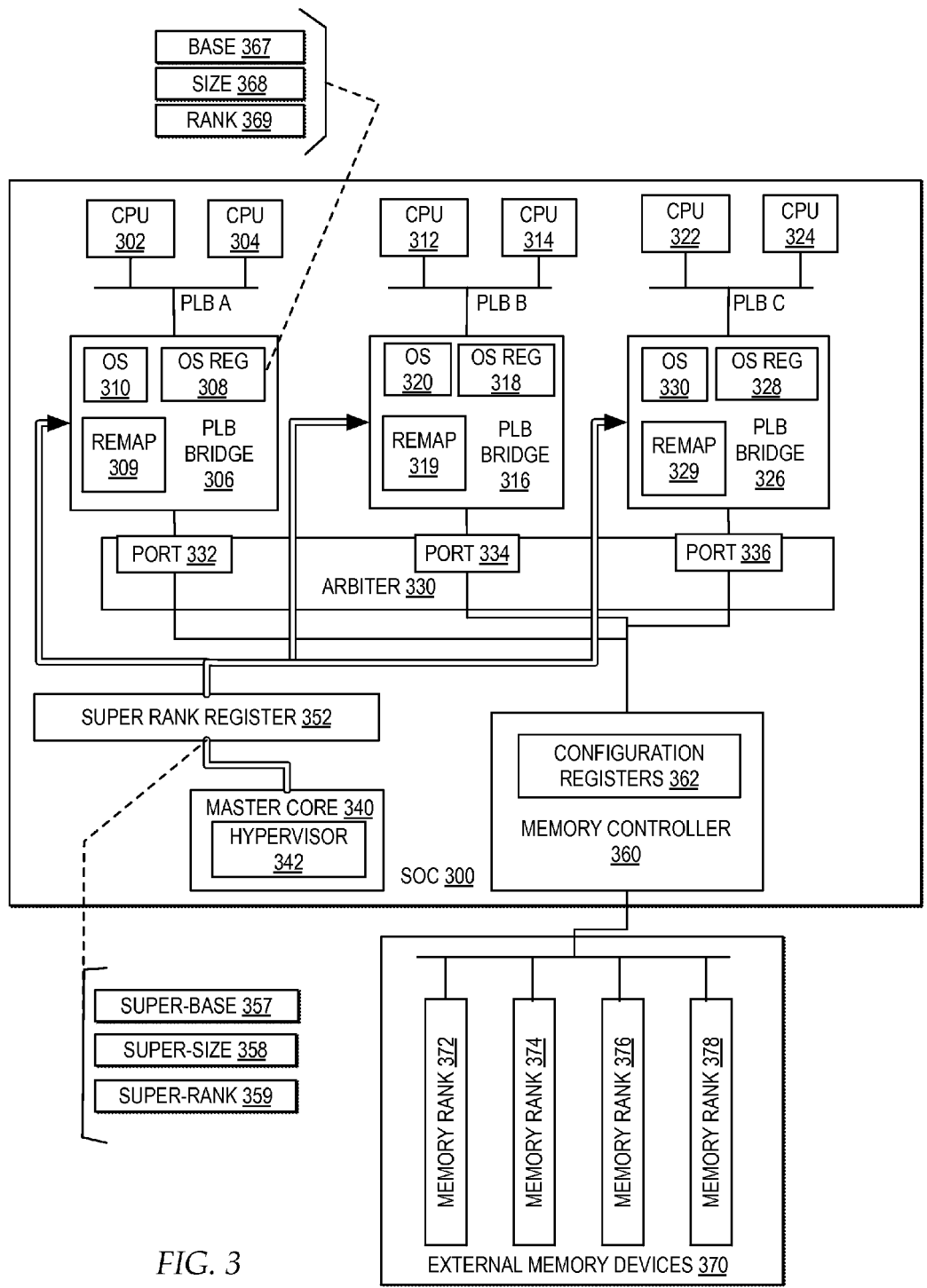
FIG. 3 illustrates one example of a block diagram of a multiple core SOC implementing a layer of one or more processor local buses (PLBs), each for managing one or more cores, and the multiple cores using a shared physical memory channel for access to one or more external memory devices.

FIG. 3 illustrates a block diagram of one example of a multiple core SOC implementing a layer of one or more processor local buses (PLBs), each for managing one or more cores, and the multiple cores using a shared physical memory channel for access to one or more external memory devices.

In one example, a system on chip (SOC) 300, as illustrated, depicts an SOC with multiple cores, illustrated as CPU 302, CPU 304, CPU 312, CPU 314, CPU 322, and CPU 324. In the example, within SOC 300, each CPU is connected to one of the one or more PLBs, illustrated as PLB A, PLB B, and PLB C. In additional or alternate examples, SOC 300 may include additional or alternate numbers and configurations of PLBs. In one example, each of the PLBs in SOC 300 may represent a same type of local bus or different types of local buses. In one example, PLBs may be implemented in the design of SOC 300 because each PLB may support one or more CPUs that run at a particular speed and throughput, wherein CPUs that run at higher speeds and throughputs may be clustered onto a particular PLB and perform together at higher speeds and throughputs. In another example, PLBs may be implemented in the design of SOC 300 for supporting reuse of IP core designs within SOC 300. In one example, IP core designs may be pre-designed and pre-verified by one or more entities for reuse across multiple SOC designs. A PLB may be specified for enabling a particular type of IP core designs to communicate and function with other types of IP core designs on other PLBs within SOC 300.

In one example, each of CPU 302, CPU 304, CPU 312, CPU 314, CPU 322, and CPU 324 may represent one or more processor cores and may also include a memory mapping unit and OS, running on each processor core, to enable one or more of virtualization by a hypervisor layer, the one or more processor cores to request allocations of memory, virtualization of memory, and management of virtual to physical memory mapping through address translation tables or translation look-aside buffers. In another example, one or more of the CPUs may represent a processor core without one or more of a memory management unit or operating system virtualization layer.

In one example, each PLB is managed by a PLB bridge running an operating system (OS), illustrated, for example, as PLB bridge 306 running OS 310, PLB bridge 316 running OS 320, and PLB bridge 236 running OS 330. In one example, each PLB may implement a same protocol or different protocols and the OS running on each PLB bridge manages communications along the PLB for the protocol implemented and translates from the protocol implemented for a PLB to a common protocol used by a memory controller 360. In one example, PLBs and PLB bridges, specified for particular types of CPUs, particular speeds, or other criteria, and each implementing a particular protocol, may be pre-designed and pre-verified by one or more entities for reuse across multiple SOC designs.

In one example, an arbiter 330 connects to each of the PLB bridges through a port specified for each PLB bridge, illustrated as port 332 connected to PLB bridge 306, port 334 connected to PLB bridge 316, and port 336 connected to PLB bridge 318. Arbiter 330 receives requests from PLB bridge 306, PLB bridge 316, and PLB bridge 326 and arbiter 330 determines the order of the requests for memory controller 360. Memory controller 360 manages access to external memory devices 370. Effectively, memory controller 360, and the busses and channels associated with memory controller 360, may be implemented as a shared physical memory channel, shared by one or more of the CPUs through PLB bridge 306, PLB bridge 316, and PLB bridge 326.

In one example, as illustrated, an external memory device 370 is connected to memory controller 360. External memory device 370 includes multiple separate memory devices, organized as ranks. For example, external memory device 370 includes four ranks illustrated as memory rank 372, memory rank 374, memory rank 376, and memory rank 378. In additional or alternate embodiments, external memory device 370 may include additional or alternate numbers and types of ranks. The use of multiple ranks within external memory device 370 allows memory controller 360 to overlap memory access requests to optimize system performance.

In one example, memory controller 360 includes configuration registers 362. In one example, configuration registers 362 includes values identifying each memory rank by specifying the start or base address 367, size 368 of each rank, and rank identifier 369 from among memory rank 372, memory rank 374, memory rank 376, and memory rank 378. Memory controller 360 may distribute the values in the configuration registers 362 to the respective PLB of PLB bridge 306, PLB bridge 316, and PLB bridge 326. The OS on each PLB bridge may store the values from configuration registers 362 in a localized OS register (reg), illustrated as OS reg 308 of PLB bridge 306, OS reg 318 of PLB bridge 316, and OS reg 328 of PLB bridge 326. The OS registers may also be referred to herein as memory registers. In one example, the OS reg in each PLB bridge provides internal, memory mapping configuration registers for each bridge, setting the range of memory regions in each memory rank that are accessible to the PLB bridge. In one example, each of the OSs of the CPUs may write to the OS registers in their respective PLB bridges to set up a partitioning of each of the memory ranks. The OS of the CPU or the OS of each PLB bridge then provides OS directed memory access enforcement by applications running on the CPUs of each PLB bridge through the use of translation tables or translation look-aside buffers on each of the CPUs attached to the PLB.

Figure 4:
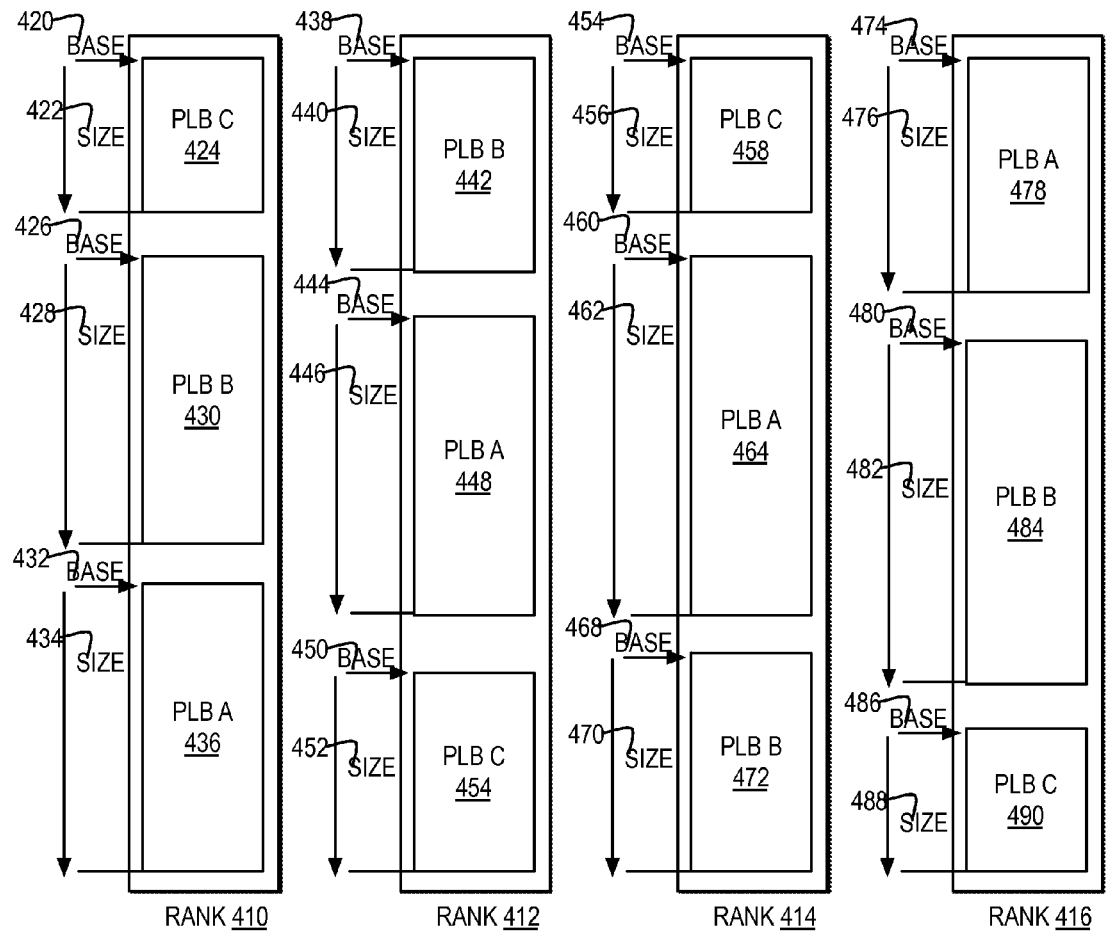
FIG. 4 illustrates one example of a block diagram of external memory devices with multiple ranks and illustrates the non-overlapping, distinct regions of each rank allocated among multiple PLBs.

Referring now to FIG. 4, FIG. 4 illustrates a block diagram of external memory devices with multiple ranks and illustrates the non-overlapping, distinct regions of each rank allocated among multiple PLBs. In one example, external memory devices 400 include a rank 410, a rank 412, a rank 414, and a rank 416. In one example, the memory regions within each of the ranks are allocated among the three PLBs illustrated in FIG. 3, of PLB A, PLB B, and PLB C. In one example, each rank may include one or more allocated regions and each of the regions may be allocated to one the PLBS. In one example, each rank may include a separate region allocated for each of the PLBs or each rank may include a separate region allocated for only a selection of the one or more PLBs. In one example, each region of memory within external memory device 400 is designated by a rank identifier, and is further identified by a base address at the start of the memory region and a size of the memory region. For example, rank 410 includes a region 424 allocated to PLB C and identified by a base 420 and a size 422, a region 430 allocated to PLB B and identified by a base 426 and a size 428, and a region 436 allocated to PLB A and identified by a base 432 and a size 434. For example, rank 412 includes a region 442 allocated to PLB B and identified by a base 438 and a size 440, a region 448 allocated to PLB A and identified by a base 444 and a size 446, and a region 454 allocated to PLB C and identified by a base 450 and a size 452. For example, rank 414 includes a region 458 allocated to PLB C and identified by a base 454 and a size 456, a region 464 allocated to PLB A and identified by a base 460 and a size 462, and a region 472 allocated to PLB B and identified by a base 468 and a size 470. For example, rank 416 includes a region 478 allocated to PLB A and identified by a base 474 and a size 476, a region 484 allocated to PLB B and identified by a base 480 and a size 482, and a region 490 allocated to PLB C and identified by a base 486 and a size 488. While in the example a region of each rank is illustrated as allocated to one of each of the PLBs, in additional or alternate examples, multiple regions with each rank may be allocated to a single PLB. While in the example, portions of each rank are illustrated as not included in any allocated region, in other embodiments, all the portions of each rank may be included in one or more of the allocated regions. In additional or alternate embodiments, additional or alternate sizes of ranks and numbers of ranks may be implemented. In addition, in additional or alternate embodiments, while FIG. 4 shows one example of how ranks may be allocated among multiple PLBS, in additional or alternate examples, the regions may be reallocated to different PLBs, the base address of regions may be changed, and the size of regions may be adjusted.

In one example, the non-overlapping distinct memory region allocation of each of the ranks, illustrated, in FIG. 4, illustrates one example of an ideal allocation of memory regions among multiple PLBs sharing a same memory controller, where the OS of each PLB bridge may enforce use by the CPUs of the respective PLB bridge within the regions illustrated in FIG. 4. In the example, the CPUs operating on SOC 300, by accessing the OS reg values of each respective PLB bridge, may operate as though the CPU has access to the memory regions associated to the PLB bridge as illustrated in FIG. 4. In some applications, however, the ideal, OS directed, non-overlapping memory region allocation illustrated in FIG. 4 may not be possible at all times. For example, where legacy internet protocol (IP) addressing needs to be maintained to enable backward compatibility, OS directed, non-overlapping memory mapping, such as is illustrated in FIG. 4, may not be possible. In another example, for running security sensitive applications where strict partitioning among various memory regions needs to be guaranteed, OS directed, non-overlapping memory mapping, such as is illustrated in FIG. 4, may not be possible.

In one example, to enable SOC 300 to handle operations where OS directed memory mapping may result in conflicting memory usage, each PLB bridge includes additional inputs to enable hardware-enforced, secure memory addressing relocation. In one example, to enable hardware-enforced, secure memory addressing relocation, each PLB bridge may include an additional selectable, relocation setting that directs remapping logic in each PLB bridge to remap one or more memory mapping values set in a local register of each bridge to one or more values set in a super rank register (reg). In one example, PLB bridge 306 includes remap logic 309 for remapping one or more values within OS reg 308 to the values in a super rank register 352 when the relocation setting is selected, PLB bridge 316 includes remap logic 319 for remapping one or more values within OS reg 318 to the values in super rank register 352 when the relocation setting is selected, and PLB bridge 326 includes remap logic 329 for remapping one or more values within OS reg 328 to the values in super rank register 352 when the relocation setting is selected. In one example, the remap logic within each PLB bridge performs the remapping transparently, without any of the CPUs or the PLB bridge OS being alerted that the remapping has occurred. By performing the remapping transparently, without any of the CPUs or the PLB bridge OS being alerted by the remapping, SOC 300 supports secure, hardware enforced address relocation within a SOC with multiple CPUs sharing memory controller 360. In one example, each OS reg includes a virtual to physical memory mapping, where the remap logic overrides the OS reg by relocating one or more of the physical memory values mapped to one or more virtual memory values, without requiring any adjustments to the virtual memory values used by the CPUs.

In one example, a master core 340 running a hypervisor 342 may set the values in super rank register 352. In another example, an authorized, external controller may set the values in super rank register 352. Super rank register 352 may include one or more remapping values each specified by a super-base 357, specifying a base address, a super-size 358, specifying a region size from the base address, and a super-rank 359, specifying an identifier for a particular rank from among the multiple memory ranks in external memory devices 370.

Figure 5:
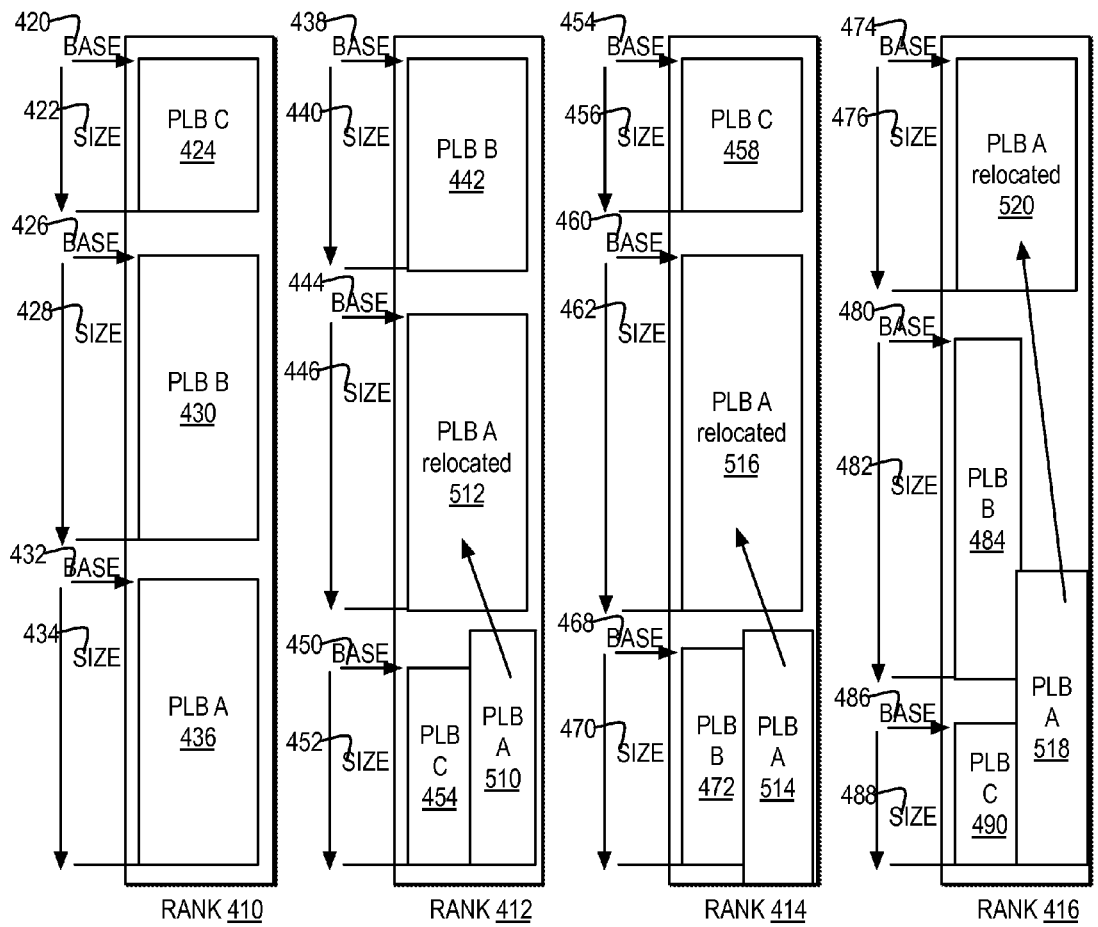
FIG. 5 illustrates one example of a block diagram of hardware-enforced, memory access enforcement at a PLB bridge level by secure address relocation, for memory access through a single memory controller shared by multiple PLB bridges.

In one example, FIG. 5 illustrates one example of hardware-enforced, memory access enforcement at a PLB bridge level by secure address relocation, for memory access by multiple processors through a single memory controller shared by multiple PLB bridges. In the example, as illustrated in FIG. 4 and FIG. 5, an ideal allocation of the memory ranks includes a region of rank 412 allocated to PLB C, illustrated at reference numeral 454, a region of rank 414 allocated to PLB B, illustrated at reference numeral 472, a region of rank 416 allocated to PLB B, illustrated at reference numeral 484, and a region of rank 416 allocated to PLB C, illustrated at reference numeral 490. In one example, if a relocation setting is not triggered for remapping PLB A to enforce memory access according to the values in super rank register 352, then, based on the values set by a CPU in OS reg 308, OS enforced memory accesses by OS 310 of PLB A may allow access to portions the bottom regions of each rank, as illustrated at region 436, region 510, region 514, and region 518. In the example, the bottom regions of each rank illustrated at region 510, region 514, and region 518 are not allocated to PLB A in the example in FIG. 4, but may be requested by a CPU 302 or CPU 304 on PLB A based on values set by the CPUs or OS 310 within OS reg 308. In one example, OS reg 308 may include a virtual to physical memory mapping that maps virtual memory addresses allocated to CPU 302 and CPU 304 physical memory addresses within region 436, region 510, region 514, and region 518.

In one example, to detect potential security gaps, master core 340 may monitor the values set in OS reg 308, OS reg 318, and OS reg 328 and may compare the values set in the local OS registers with an ideal configuration set in configuration registers 362 or may compare the values set in each OS reg with one another to determine if any allocations overlap. Hypervisor 342 may detect that the addressing in one or more of the OS registers does not match with the ideal allocation of the memory, as illustrated in FIG. 4, or may detect overlapping memory allocations among the local OS registers, and select the values to load into super rank register 352 to control secure address relocation by one or more of the PLB bridges.

In the example illustrated at FIG. 5, a block diagram illustrates a secure address relocation, for hardware-enforced memory access to external memory, by PLB A, from among multiple bridges accessing external memory through a shared memory access channel. In one example, master core 340 sets super rank register 352 with values that enable secure address relocation of region 510 to region 512, region 514 to region 516, and region 518 to region 520. In one example, super rank register 352 may include an entry with super-rank 359 set to rank 410, super-base 357 set to base 432 and super-size 358 set to size 434, or super rank register 352 may not include a super-rank value for any rank where relocation is not required. In addition, in one example, super rank register 352 may include an entry with super-rank 359 set to rank 412, super-base 357 set to base 444, and super-size 358 set to size 446, for hardware-enforced secure address relocation within rank 412. In addition, in one example, super-rank register 352 may include an entry with super-rank 359 set to rank 414, super-base 357 set to base 460, and super-size 358 set to size 462, for hardware-enforced secure address relocation within rank 414. In addition, in one example, super-rank register 352 may include an entry with super-rank 359 set to rank 416, super-base 357 set to base 480, and super-size 358 set to size 482, for hardware-enforced secure address relocation within rank 416.

In one example, master core 340 selects the relocation setting for PLB A, which triggers remap logic 309 to automatically override one or more values in OS reg 308 to be relocated to values within super rank register 352. In another example, the remap logic of one or more bridges may be automatically selected when super rank register 352 is loaded. In the example, overriding one or more values in OS reg 308 to relocate the physical memory allocations for PLB A to the regions specified within super rank register 352 is performed by remap 309 in a manner that is transparent to OS 310 and to CPU 302 and CPU 304. CPU 302 or CPU 304 may send memory access requests to OS 310 with virtual addressing previously mapped to region 510, region 514, and region 518, however, in translating virtual to physical addressing, OS 310 applies the values in OS reg 308, which include virtual memory addresses originally mapped to region 436 and virtual memory addresses relocated to region 510, region 514, and region 518. In one example, memory controller 360 may manage one or more virtualization layers and may perform additional translations of memory requests prior to sending memory requests to external memory devices 370.

In one example, as illustrated, while SOC 300 may include multiple memory controllers, each memory controller requires significant additional space within the SOC design, along with requiring additional pins and buses, which also adds to the size and cost of the SOC. Within SOC 300, by implementing a single memory controller, but adding a super rank register, master core, and remap logic for hardware enforced memory access enforcement, a single memory controller can be shared by multiple PLB bridges with minimal additional space required for managing memory access enforcement.

Figure 6:
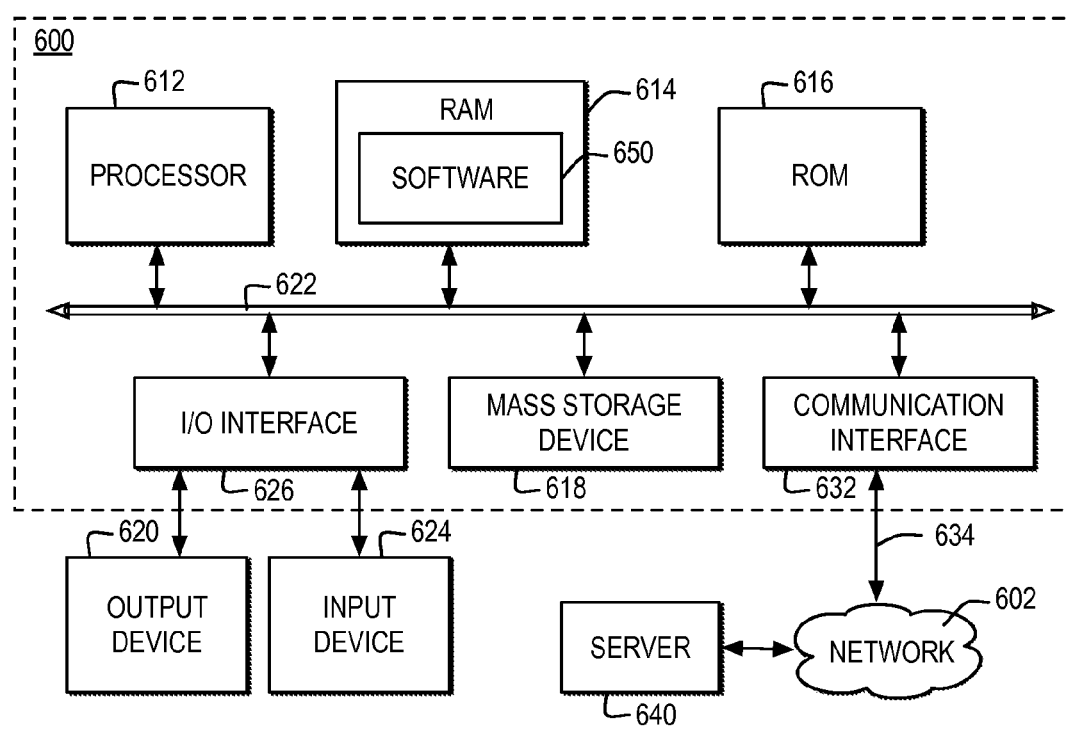
FIG. 6 illustrates one example of a block diagram of a computer system in which one embodiment of the invention may be implemented.

FIG. 6 illustrates a block diagram of one example of a computer system in which one embodiment of the invention may be implemented. The present invention may be performed in a variety of systems and combinations of systems, made up of functional components, such as the functional components described with reference to a computer system 600 and may be communicatively connected to a network, such as network 602.

Computer system 600 includes a bus 622 or other communication device for communicating information within computer system 600, and at least one hardware processing device, such as processor 612, coupled to bus 622 for processing information. Bus 622 preferably includes low-latency and higher latency paths that are connected by bridges and adapters and controlled within computer system 600 by multiple bus controllers. When implemented as a server or node, computer system 600 may include multiple processors designed to improve network servicing power. Where multiple processors share bus 622, additional controllers (not depicted) for managing bus access and locks may be implemented. In addition, processor 612 may represent a SOC that includes multiple cores integrated into a single integrated circuit and computer system 600 may include a SOC, such as SOC 300. In addition, in one example, all or portions of computer system 600 may be integrated into an SOC.

Processor 612 may be at least one general-purpose processor that, during normal operation, processes data under the control of software 650, which may include at least one of application software, an operating system, middleware, and other code and computer executable programs accessible from a dynamic storage device such as random access memory (RAM) 614, a static storage device such as Read Only Memory (ROM) 616, a data storage device, such as mass storage device 618, or other data storage medium. Software 650 may include, but is not limited to, code, applications, protocols, interfaces, and processes for controlling one or more systems within a network including, but not limited to, an adapter, a switch, a server, a cluster system, and a grid environment. In one example, RAM 614 or ROM 616 may represent external memory devices to an SOC within computer system 600, such RAM 616 or ROM 616 representing external memory devices 124. In another example, computer system 600 may represent a SOC, where computer system 600 then connects to external memory, such as external memory devices 124, through a shared physical memory channel of computer system 600.

Computer system 600 may communicate with a remote computer, such as server 640, or a remote client. In one example, server 640 may be connected to computer system 600 through any type of network, such as network 602, through a communication interface, such as network interface 632, or over a network link that may be connected, for example, to network 602.

In the example, multiple systems within a network environment may be communicatively connected via network 602, which is the medium used to provide communications links between various devices and computer systems communicatively connected. Network 602 may include permanent connections such as wire or fiber optics cables and temporary connections made through telephone connections and wireless transmission connections, for example, and may include routers, switches, gateways and other hardware to enable a communication channel between the systems connected via network 602. Network 602 may represent one or more of packet-switching based networks, telephony based networks, broadcast television networks, local area and wire area networks, public networks, and restricted networks.

Network 602 and the systems communicatively connected to computer 600 via network 602 may implement one or more layers of one or more types of network protocol stacks which may include one or more of a physical layer, a link layer, a network layer, a transport layer, a presentation layer, and an application layer. For example, network 602 may implement one or more of the Transmission Control Protocol/Internet Protocol (TCP/IP) protocol stack or an Open Systems Interconnection (OSI) protocol stack. In addition, for example, network 602 may represent the worldwide collection of networks and gateways that use the TCP/IP suite of protocols to communicate with one another. Network 602 may implement a secure HTTP protocol layer or other security protocol for securing communications between systems.

In the example, network interface 632 includes an adapter 634 for connecting computer system 600 to network 602 through a link and for communicatively connecting computer system 600 to server 640 or other computing systems via network 602. Although not depicted, network interface 632 may include additional software, such as device drivers, additional hardware and other controllers that enable communication. When implemented as a server, computer system 600 may include multiple communication interfaces accessible via multiple peripheral component interconnect (PCI) bus bridges connected to an input/output controller, for example. In this manner, computer system 600 allows connections to multiple clients via multiple separate ports and each port may also support multiple connections to multiple clients.

In one embodiment, the operations performed by processor 612 may control the operations of flowchart of FIGS. 7-10 and other operations described herein. Operations performed by processor 612 may be requested by software 650 or other code or the steps of one embodiment of the invention might be performed by specific hardware components that contain hardwired logic for performing the steps, or by any combination of programmed computer components and custom hardware components. In one embodiment, one or more components of computer system 600, or other components, which may be integrated into one or more components of computer system 600, may contain hardwired logic for performing the operations of flowcharts in FIGS. 7-10.

In addition, computer system 600 may include multiple peripheral components that facilitate input and output. These peripheral components are connected to multiple controllers, adapters, and expansion slots, such as input/output (I/O) interface 626, coupled to one of the multiple levels of bus 622. For example, input device 624 may include, for example, a microphone, a video capture device, an image scanning system, a keyboard, a mouse, or other input peripheral device, communicatively enabled on bus 622 via I/O interface 626 controlling inputs. In addition, for example, output device 620 communicatively enabled on bus 622 via I/O interface 626 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 6, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 6 may vary. Furthermore, those of ordinary skill in the art will appreciate that the depicted example is not meant to imply architectural limitations with respect to the present invention.

FIG. 6 illustrates one example of a block diagram of an integrated circuit that functions as a SOC with multiple processors connected through a shared physical memory channel to access external memory. In one example, processor 612 may represent a SOC. In another example, computer system 600, and the blocks described in computer system 600, may be implemented using one or more integrated circuit devices and may function as an SOC. In one example, one or more of the blocks of computer system 600 may be implemented as integrated into an SOC, such as SOC 300. One of ordinary skill in the art will appreciate that the invention should not be limited to use within a particular design or end use of an integrated circuit. Integrated circuits may be designed and fabricated using one or more computer data files, which may also be referred to as hardware definition programs, which define the layout of the circuit arrangements on the devices. Hardware definition programs may be generated by a design tool and then used during manufacturing to create layout masks to define the circuit arrangements to be applied to a semiconductor wafer when fabricating a SOC. As previously described with reference to FIG. 2 and FIG. 3, an SOC design may include multiple processor cores connected to a shared physical memory channel. In one example, a design tool, upon detecting an SOC design including multiple cores connected to a shared physical memory channel, may prompt a designer to add one or more of a super rank register, a master core, and remap logic, as illustrated in FIG. 3. In another example, a design tool, upon detecting an SOC design including multiple cores connected to a shared physical memory channel, may automatically integrated, within the design, one or more of a super rank register, a master core, and remap logic as illustrated in FIG. 3.

FIG. 7 illustrates a high level logic flowchart of a process and program for managing a design of a SOC to enable the SOC to perform secure address relocation within a multi-processor system sharing a same physical memory channel to external memory. In one example, the process starts at block 700 and thereafter proceeds to block 702. Block 702 illustrates a determination whether an SOC design includes multiple CPUs sharing a single physical memory channel through one or more bridges. At block 702, if an SOC design includes multiple CPUs sharing a single physical memory channel through one or more bridges, then the process passes to block 704. Block 704 illustrates designating a particular processor core as a master core, enabled for running a hypervisor layer within the SOC design. Next, block 706 illustrates adding a super rank register to the SOC design, where only the master core is enabled to set values in the super rank register. Thereafter, block 708 illustrates adding remapping logic to each bridge, wherein when enabled, the remap logic reads the super rank register and overrides a local OS register of each bridge with the values in the super rank register, wherein an OS layer of each bridge enforces memory accesses by the CPUs according to values in the local OS register, and the process ends. In one example, an SOC design interface may prompt a designer to perform one or more of the steps illustrated at block 704, block 706, and block 708. In another example, and SOC design interface may automatically perform one or more of the steps illustrated at block 704, block 706, and block 708.

FIG. 8 illustrates a high level logic flowchart of a process and program for triggering hardware enforced memory access management within a multi-processor system sharing a same physical memory channel to external memory. In one example, the process starts at block 800 and thereafter proceeds to block 802. Block 802 illustrates a determination whether a hypervisor of a master core determines values marked as super rank values. In one example, the hypervisor may determine values marked as super rank values by determining that there is overlap in memory allocations by one or more CPUs within the multi-processor system and selecting super rank values to direct secure address relocation of the allocations of one or more regions of memory by one or more CPUs. In another example, a hypervisor may determine values marked as super rank values by detecting inputs to the multi-processor system that are marked as super rank values. At block 802, if the hypervisor determines that there are values marked as super rank values, then the process passes to block 804. Block 804 illustrates setting the super rank register to the values marked as super rank values. Next, block 806 illustrates selecting the relocation setting to activate the remap logic of one or more of the bridges to override one or more values set in each local OS register of the one or more bridges, and the process ends.

Figures 9, 10:
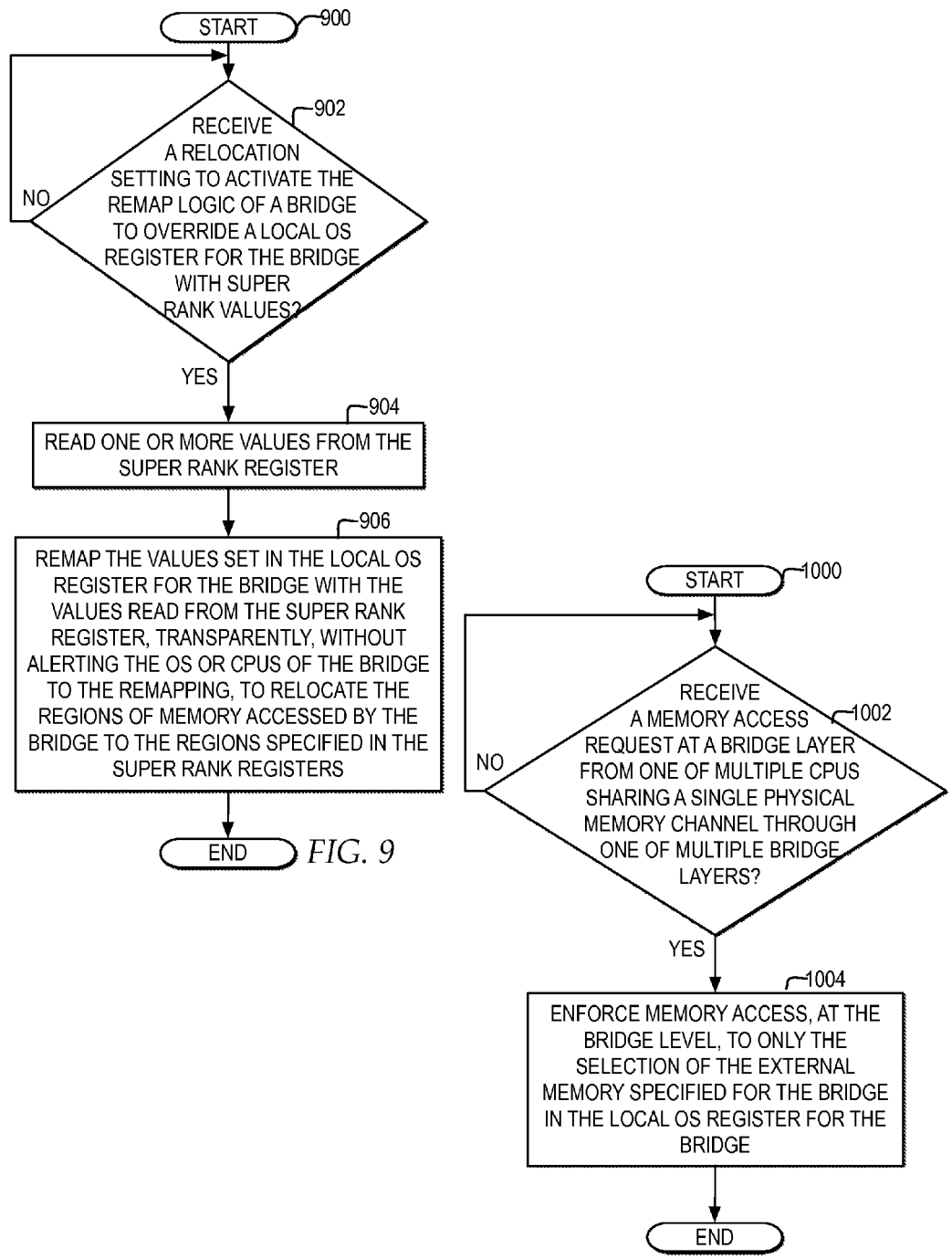
FIG. 9 illustrates one example of a high level logic flowchart of a process and program for controlling secure memory address relocation by remap logic at a bridge layer, within each bridge of a multi-processor system sharing a same physical memory channel to external memory.
FIG. 10 illustrates one example of a high level logic flowchart of a process and program for controlling hardware-enforced, OS controlled, bridge level, memory enforcement within a multi-processor system sharing a same physical memory channel to external memory.

FIG. 9 illustrates a high level logic flowchart of a process and program for controlling secure memory address relocation by remap logic at a bridge layer, within each bridge of a multi-processor system sharing a same physical memory channel to external memory. In one example, the process start at block 900 and thereafter proceeds to block 902. Block 902 illustrates a determination whether a relocation setting is received to activate the remap logic of a bridge to override a local OS register for the bridge with super rank values. At block 902, if a relocation setting is received to activate the remap logic of a bridge to override a local OS register for the bridge with super rank values, then the process passes to block 904. Block 904 illustrates reading one or more values from the super rank register. Block 906 illustrates remapping the values set in the local OS register for the bridge with the values read from the super rank register, transparently, without alerting the OS or CPUs of the bridge to the remapping, to relocate the portion of the memory accessed by the bridge to the memory regions specified in the super rank registers, and the process ends.

FIG. 10 illustrates a high level logic flowchart of a process and program for controlling hardware-enforced, OS controlled, bridge level, memory enforcement within a multi-processor system sharing a same physical memory channel to external memory. In one example, the process starts at block 1000 and thereafter proceeds to block 1002. Block 1002 illustrates a determination whether an OS of a bridge receives a memory access request at the bridge layer from one of multiple CPUs sharing a single physical memory channel through one of multiple bridge layers. At block 1002, if an OS of a bridge receives a memory access request at the bridge layer from one of multiple CPUs sharing a single physical memory channel through one of multiple bridge layers, then the process passes to block 1004. Block 1004 illustrates enforcing memory access, at the bridge level, to only the selection of the external memory specified for the bridge in the local OS register for the bridge, and the process ends. In one example, the OS of the bridge may enforce the memory access to only the selection of the external memory specified for the bridge in the local OS register for the bridge by only allowing memory requests specifying virtual memory addresses that translate to physical memory addresses specified in the local OS register for the bridge. In one example, the local OS register for the bridge may include values set by one or more CPUs, the OS of the bridge, or by memory controller 360. In addition, in one example, the local OS register for the bridge may include values overridden by the values set a super rank register by a master core.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A system for performing secure address relocation, comprising:
    an integrated circuit comprising a plurality of bridges connected through a shared physical memory channel to one or more external memory devices connected to one or more interfaces of the integrated circuit; the integrated circuit operative, in response to receiving a selection to override an existing memory allocation of one or more regions of the one or more external memory devices within a memory register for a particular bridge from among the plurality of bridges, to trigger a remap controller of the particular bridge, to read from a super rank register, one or more super rank values specifying one or more relocation regions of the one or more external memory devices; and
    the remap controller operative to remap the memory register for the particular bridge with the one or more super rank values specified in the super rank register to relocate memory accesses by the bridge to the one or more relocation regions of the one or more external memory devices, wherein one or more processor units are connected to each of the plurality of bridges within a single integrated circuit device, wherein only a particular processor unit of the integrated device is allowed to set the super rank register values.

2. The system according to claim 1, wherein the integrated circuit operative, in response to receiving a selection to override an existing memory allocation of one or more regions of the one or more external memory devices within a memory register for a particular bridge from among the plurality of bridges, to trigger a remap controller of the particular bridge, to read from a super rank register, one or more super rank values specifying one or more relocation regions of the one or more external memory devices further comprises:
    the integrated circuit operative to receive the selection to override the existing memory allocation from the particular processor unit selecting to activate the remap controller.

3. The system according to claim 1, wherein the integrated circuit operative, in response to receiving a selection to override an existing memory allocation of one or more regions of the one or more external memory devices within a memory register for a particular bridge from among the plurality of bridges, to trigger a remap controller of the particular bridge, to read from a super rank register, one or more super rank values specifying one or more relocation regions of the one or more external memory devices further comprises:
    the remap controller operative to read the one or more super rank values each specifying a particular rank within a plurality of ranks of the one or more external memory devices, a base address within the particular rank, and a size of a region starting at the base address within the particular rank.

4. The system according to claim 1, further comprising:
    each of the plurality of bridges operative to send one or more memory requests through the shared physical memory channel to the one or more external memory devices, wherein the shared physical memory channel comprises a single memory controller for managing memory access requests by a plurality of processor units within the integrated circuit to the external memory device.

5. The system according to claim 1, further comprising:
    an operating system controller of the particular bridge operative, in response to a memory request for the external memory device received by the particular bridge from an application of a requesting processor unit attached to the bridge, to restrict the requesting processor unit to only access memory within regions specified in the memory register.

6. The system according to claim 5, wherein the remap controller operative to remap the memory register for the particular bridge with the one or more super rank values specified in the super rank register to relocate memory accesses by the bridge to the one or more relocation regions of the one or more external memory devices, wherein one or more processor units are connected to each of the plurality of bridges within a single integrated circuit device, wherein only a particular processor unit of the integrated device is allowed to set the super rank register values further comprises:
    the remap controller operative to remap the memory register without alerting the operating system controller and the requesting processor unit to the remapping of the memory register.

7. The system according to claim 1, wherein the remap controller operative to remap the memory register for the particular bridge with the one or more super rank values specified in the super rank register to relocate memory accesses by the bridge to the one or more relocation regions of the one or more external memory devices, wherein one or more processor units are connected to each of the plurality of bridges within a single integrated circuit device, wherein only a particular processor unit of the integrated device is allowed to set the super rank register values further comprises:
    each of the plurality of bridges operative to control a separate remap controller and a separate memory register, wherein the one or more processor units attached to each of the plurality of bridges are enabled to set initial values in the separate memory register, where the separate remap controller is triggered by the particular processor unit to read the super rank register; and
    each separate remap controller, in response to the particular processor unit triggering each separate remap controller, operative to remap each separate memory register to override the initial values within the memory register with the one or more super rank values specified in the super rank register to relocate memory accesses by the bridge from one or more initial regions specified by the initial values to the one or more relocation regions, wherein the initial values are mapped to virtual memory addresses, wherein the initial values are overridden without requiring adjustment of the virtual memory addresses.

8. A method for performing secure address relocation, comprising:
introducing a computer program product readable by a machine, tangibly embodying a program of instructions executable by the machine to perform the method steps for securing address relocation, said method steps comprising:
in response to receiving a selection to override an existing memory allocation of one or more regions of one or more external memory devices within a memory register for a particular bridge from among a plurality of bridges within an integrated circuit, wherein the plurality of bridges connect through a shared physical memory channel to the one or more external memory devices, reading, by a remap controller of the particular bridge, from a super rank register, one or more super rank values specifying one or more relocation regions of the one or more external memory devices connected to one or more interfaces of the integrated circuit; and
remapping, by the remap controller, the memory register for the particular bridge with the one or more super rank values specified in the super rank register to relocate memory accesses by the bridge to the one or more relocation regions of the one or more external memory devices, wherein one or more processor units are connected to each of the plurality of bridges within a single integrated circuit device, wherein only a particular processor unit of the integrated device is allowed to set the super rank register values.

9. The method according to claim 1, wherein in response to receiving the selection to override the existing memory allocation of one or more regions of the one or more external memory devices within the memory register for the particular bridge from among the plurality of bridges within the integrated circuit, wherein the plurality of bridges connect through the shared physical memory channel to the one or more external memory devices, reading, by the remap controller of the particular bridge, from the super rank register, the one or more super rank values specifying the one or more relocation regions of the one or more external memory devices connected to the interface of the integrated circuit further comprises:
receiving the selection to override the existing memory allocation from the particular processor unit selecting to activate the remap controller.

10. The method according to claim 1, wherein in response to receiving the selection to override the existing memory allocation of one or more regions of the one or more external memory devices within the memory register for the particular bridge from among the plurality of bridges within the integrated circuit, wherein the plurality of bridges connect through the shared physical memory channel to the one or more external memory devices, reading, by the remap controller of the particular bridge, from the super rank register, the one or more super rank values specifying the one or more relocation regions of the one or more external memory devices connected to the interface of the integrated circuit further comprises:
reading the one or more super rank values each specifying a particular rank within a plurality of ranks of the one or more external memory devices, a base address within the particular rank, and a size of a region starting at the base address within the particular rank.

11. The method according to claim 1, further comprising:
sending, by each of the plurality of bridges, one or more memory requests through the shared physical memory channel to the one or more external memory devices, wherein the shared physical memory channel comprises a single memory controller for managing memory access requests by a plurality of processor units within the integrated circuit to the external memory device.

12. The method according to claim 1, further comprising:
in response to a memory request for the external memory device received by the particular bridge from an application of a requesting processor unit attached to the bridge, restricting by an operating system controller of the particular bridge, the requesting processor unit to only access memory within regions specified in the memory register.

13. The method according to claim 12, wherein remapping, by the remap controller, the memory register for the particular bridge with the one or more super rank values specified in the super rank register to relocate memory accesses by the bridge to the one or more relocation regions of the one or more external memory devices, further comprises:
remapping, by the remap controller, the memory register without alerting the operating system controller and the requesting processor unit to the remapping of the memory register.

14. The method according to claim 1, wherein remapping, by the remap controller, the memory register for the particular bridge with the one or more super rank values specified in the super rank register to relocate memory accesses by the bridge to the one or more relocation regions of the one or more external memory devices, further comprises:
controlling, within each of the plurality of bridges, a separate remap controller and a separate memory register, wherein the one or more processor units attached to each of the plurality of bridges are enabled to set initial values in the separate memory register, where the separate remap controller is triggered by the particular processor unit to read the super rank register; and in response to the particular processor unit triggering each separate remap controller, remapping, each separate memory register to override the initial values within the memory register with the one or more super rank values specified in the super rank register to relocate memory accesses by the bridge from one or more initial regions specified by the initial values to the one or more relocation regions, wherein the initial values are mapped to virtual memory addresses, wherein the initial values are overridden without requiring adjustment of the virtual memory addresses.

15. A computer program product for performing secure address relocation, the computer program product comprising a computer readable storage medium having program instructions embodied therewith, the program instructions executable by a integrated circuit to cause the integrated circuit to:
in response to receiving a selection to override an existing memory allocation of one or more regions of one or more external memory devices within a memory register for a particular bridge from among a plurality of bridges within the integrated circuit, wherein the plurality of bridges connect through a shared physical memory channel to the one or more external memory devices, read, by a remap controller of the particular bridge, from a super rank register, one or more super rank values specifying one or more relocation regions of the one or more external memory devices connected to one or more interfaces of the integrated circuit; and remap, by the remap controller, the memory register for the particular bridge with the one or more super rank values specified in the super rank register to relocate memory accesses by the bridge to the one or more relocation regions of the one or more external memory devices, wherein one or more processor units are connected to each of the plurality of bridges within a single integrated circuit device, wherein only a particular processor unit of the integrated device is allowed to set the super rank register values.

16. The computer program product according to claim 15, further comprising the program instructions executable by the integrated circuit to cause the integrated circuit to receive the selection to override the existing memory allocation from the particular processor unit selecting to activate the remap controller.

17. The computer program product according to claim 15, further comprising the program instructions executable by the integrated circuit to cause the integrated circuit to read the one or more super rank values each specifying a particular rank within a plurality of ranks of the one or more external memory devices, a base address within the particular rank, and a size of a region starting at the base address within the particular rank.

18. The computer program product according to claim 15, further comprising the program instructions executable by the integrated circuit to cause the integrated circuit to send, by each of the plurality of bridges, one or more memory requests through the shared physical memory channel to the one or more external memory devices, wherein the shared physical memory channel comprises a single memory controller for managing memory access requests by a plurality of processor units within the integrated circuit to the external memory device.

19. The computer program product according to claim 18, further comprising the program instructions executable by the integrated circuit to cause the integrated circuit to, in response to a memory request for the external memory device received by the particular bridge from an application of a requesting processor unit attached to the bridge, restrict, by an operating system controller of the particular bridge, the requesting processor unit to only access memory within regions specified in the memory register.

20. The computer program product according to claim 19, further comprising the program instructions executable by the integrated circuit to cause the integrated circuit to remap, by the remap controller, the memory register without alerting the operating system controller and the requesting processor unit to the remapping of the memory register.

21. The computer program product according to claim 19, further comprising:
   the program instructions executable by the integrated circuit to cause the integrated circuit to: control, within each of the plurality of bridges, a separate remap controller and a separate memory register, wherein the one or more processor units attached to each of the plurality of bridges are enabled to set initial values in the separate memory register, where the separate remap controller is triggered by the particular processor unit to read the super rank register; and
   in response to the particular processor unit triggering each separate remap controller, remap, each separate memory register to override the initial values within the memory register with the one or more super rank values specified in the super rank register to relocate memory accesses by the bridge from one or more initial regions specified by the initial values to the one or more relocation regions, wherein the initial values are mapped to virtual memory addresses, wherein the initial values are overridden without requiring adjustment of the virtual memory addresses.

* * * * *